United States Patent
Zhang et al.

(10) Patent No.: US 8,043,759 B2
(45) Date of Patent: Oct. 25, 2011

(54) HYDROGEN CHAMBER ENCLOSED FUEL CELL STACK AND RELATED FUEL CELL SHUTDOWN OPERATION

(75) Inventors: Jingxin Zhang, Rochester, NY (US); Hubert A. Gasteiger, Leghorn (IT); Paul Taichiang Yu, Pittsford, NY (US); Frederick T. Wagner, Fairport, NY (US); Steven G. Goebel, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 735 days.

(21) Appl. No.: 12/108,000

(22) Filed: Apr. 23, 2008

(65) Prior Publication Data

US 2009/0269627 A1    Oct. 29, 2009

(51) Int. Cl.
*H01M 8/04* (2006.01)

(52) U.S. Cl. ........ 429/444; 429/446; 429/429; 429/515; 429/452

(58) Field of Classification Search ................. 429/428, 429/429, 430, 452, 443, 446, 444, 467, 427, 429/436, 423, 515
See application file for complete search history.

(56) References Cited

U.S. PATENT DOCUMENTS

| 6,913,845 | B2 | 7/2005 | Bekkedahl et al. |
|---|---|---|---|
| 2005/0058860 | A1 | 3/2005 | Goebel |
| 2006/0040150 | A1 | 2/2006 | Yu et al. |
| 2006/0046106 | A1 | 3/2006 | Yu et al. |
| 2006/0093883 | A1* | 5/2006 | Pristash ................ 429/30 |
| 2009/0110971 | A1* | 4/2009 | Nishimura et al. ......... 429/13 |

OTHER PUBLICATIONS

Hydrogen Safety, Wikipedia, http://en.wikipedia.org/wiki/Hydrogen_safety.
Hydrogen Safety, Wikipedia, http://en.wikipedia.org/wiki/Hydrogen_safety.

* cited by examiner

*Primary Examiner* — Raymond Alejandro
(74) *Attorney, Agent, or Firm* — Reising Ethington P.C.

(57) ABSTRACT

A product includes a fuel cell stack, and an enclosure apparatus sealingly enclosing the fuel cell stack to define a hydrogen chamber between the fuel cell stack and the enclosure apparatus. An operation of the product may include maintaining a positive pressure of hydrogen in the hydrogen chamber.

14 Claims, 7 Drawing Sheets

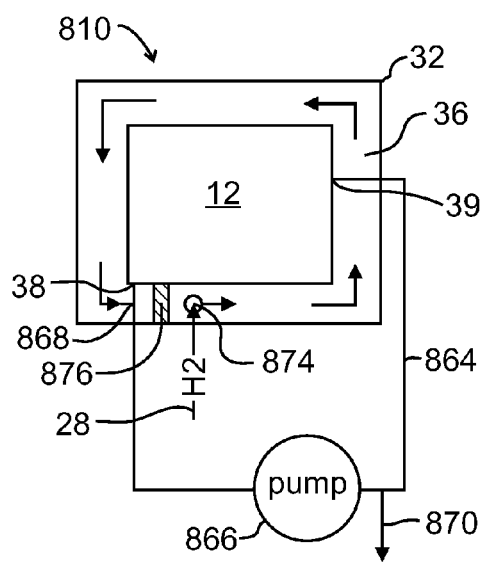
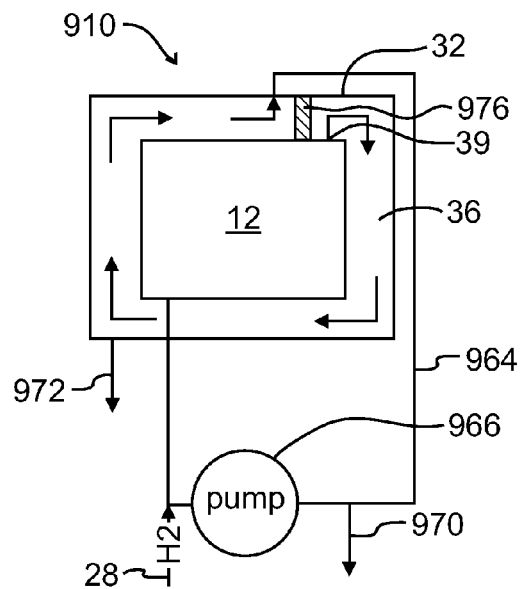
FIG. 8
FIG. 9

HYDROGEN CHAMBER ENCLOSED FUEL CELL STACK AND RELATED FUEL CELL SHUTDOWN OPERATION

TECHNICAL FIELD

The field to which the disclosure generally relates includes fuel cell stacks, and methods of operating fuel cell stacks including starting up and shutting down of such fuel cell stacks.

BACKGROUND

A fuel cell typically includes a cathode side, an anode side, an electrolyte portion sandwiched between the cathode and anode sides, and an electrical circuit across the anode and cathode sides. Pressurized hydrogen is supplied to the anode side and pressurized oxygen (in air) is supplied to the cathode side. A catalyst on the anode side splits the hydrogen into electrons and protons. Because the electrolyte portion is an $H^+$ ion conductor, the protons migrate from the anode side, through the electrolyte portion, to the cathode side. But because the electrolyte portion is also an electrical insulator, it forces the electrons to flow through the electrical circuit to do useful work en route to the cathode side of the fuel cells. Excess hydrogen flows away from the anode side and can be recycled through the stack or back to a hydrogen source. A catalyst on the cathode side electro-catalyzes the pressurized oxygen (in air) combining with the protons flowing through the electrolyte portion from the anode and with the electrons flowing through the electrical circuit to yield water.

SUMMARY OF EXEMPLARY EMBODIMENTS OF THE INVENTION

One embodiment of the invention may include a product including a fuel cell stack, and an enclosure apparatus sealingly enclosing the fuel cell stack to define a hydrogen chamber between the fuel cell stack and the enclosure apparatus.

Another embodiment of the invention may include a method including operating a fuel cell apparatus including operating a fuel cell system including a fuel cell stack, and a fuel cell enclosure at least partially enclosing the fuel cell stack and at least partially defining a hydrogen chamber between the enclosure and the stack, which includes an anode side and a cathode side. The operation comprising including flowing hydrogen into the anode side and flowing air into the cathode side, producing electricity, and operating a primary electrical device connected to the stack using the electricity. The method also includes shutting down the stack including: disconnecting the stack from the primary electrical device; stopping the flow of air into and out of the cathode side; maintaining a positive pressure of hydrogen in the hydrogen chamber between the enclosure and the stack above atmospheric pressure; and allowing oxygen in the stack to be consumed by hydrogen.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 8 is a schematic view of a portion of a fuel cell system according to another embodiment of the invention;

FIG. 9 is a schematic view of a portion of a fuel cell system according to another embodiment of the invention;

DETAILED DESCRIPTION OF EXEMPLARY EMBODIMENTS

The following description of the embodiments is merely exemplary in nature and is in no way intended to limit the invention, its application, or uses.

Figure 1:
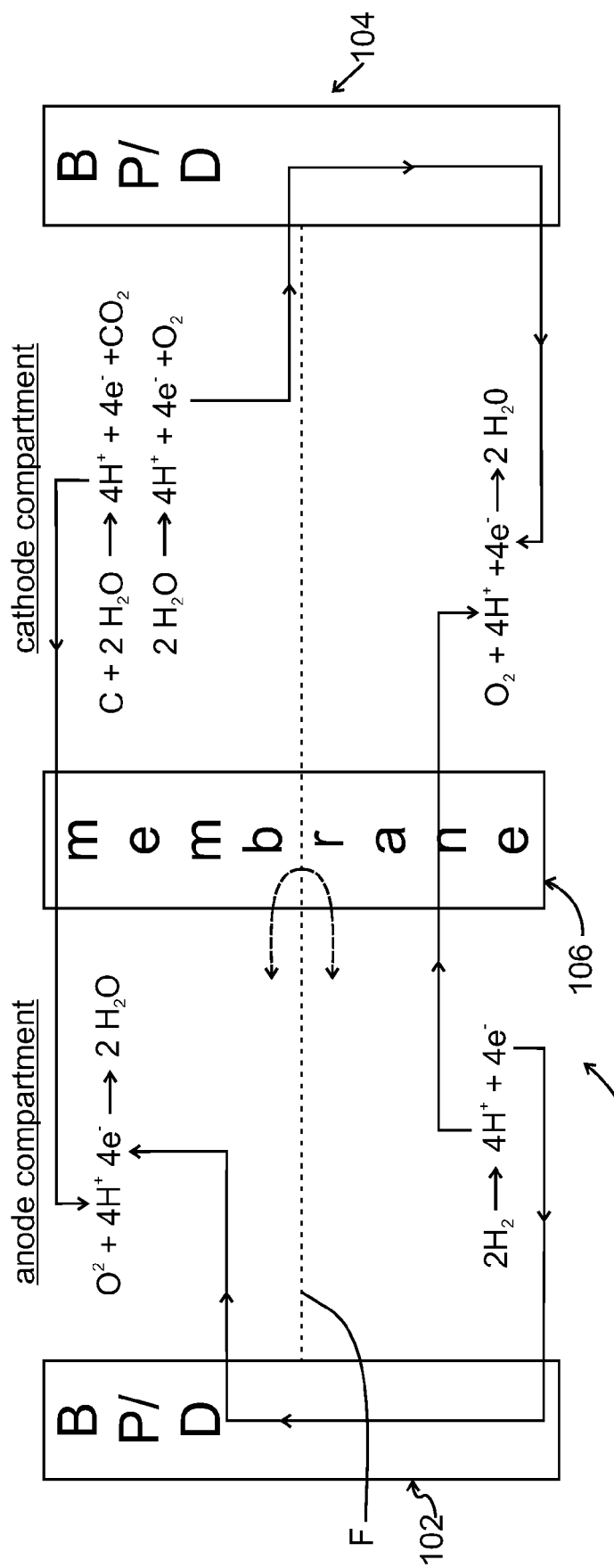
FIG. 1 is a schematic view of a fuel cell when there is an $H_2$/air front in the fuel cell during startup or shutdown.

With reference to FIG. 1, an $H_2$/air front F is shown in an automotive fuel cell 100, which may include an anode side 102, a cathode side 104, and a electrolyte membrane 106 therebetween. In general, the front F may be formed during startup and shutdown of the fuel cell 100, and may cause cathode carbon corrosion reactions and, consequently, fuel cell degradation. When the fuel cell 100 is shut down and there is no longer a load across the fuel cell 100, flow of hydrogen into the anode side 102 is terminated. But some hydrogen may remain and air may leak into the anode side 102, thereby resulting in high cathode potentials in the air/air section of the fuel cell electrode, which will cause catalyst or catalyst support oxidation and corrosion and concomitant fuel cell performance degradation.

More specifically, when the fuel cell 100 is shut down, hydrogen remaining in the anode side 102 and oxygen remaining in the cathode side 104 will gradually react with each other by crossover of these reactant gases across the electrolyte membrane 106. Furthermore, water vapor formed during normal operating conditions in anode and cathode compartments will condense into liquid water when the fuel cell 100 cools after shutdown. This cooling and condensation may also create a vacuum condition within the fuel cell 100. As a result, oxygen in air surrounding the fuel cell 100 may diffuse back into the fuel cell 100 under the vacuum condition and thereby may form the $H_2$/air front F. At startup, and assuming the anode and cathode sides 102, 104 are filled with air, pressurized hydrogen may then fed into the anode side 102, thereby reforming the $H_2$/air front F.

In both shutdown/startup cases, the $H_2$/air front F in the anode side 102 divides anode and cathode compartments across the fuel cell 100, as shown. Hydrogen in the anode compartment on one side of the front F provides protons and electrons via a hydrogen oxidation reaction (HOR). The electrons from the HOR necessitate an $O_2$ reduction reaction (ORR) in the anode compartment on the other side of the front F while the protons from the HOR migrate through the membrane 106 to the cathode compartment for another ORR. Because the electrons of the ORR in the anode compartment combine with protons, and because proton transport resistance through the membrane 106 becomes infinitely large for a distance over about 2.5 mm, oxygen evolution reaction (OER) (Equation 1) and carbon oxidation reaction (COR) (Equation 2) occur in the cathode compartment to provide protons to balance the ORR in the anode compartment.

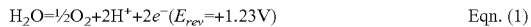

$$H_2O = \tfrac{1}{2}O_2 + 2H^+ + 2e^- (E_{rev} = +1.23V) \qquad \text{Eqn. (1)}$$

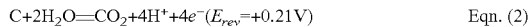

$$C + 2H_2O = CO_2 + 4H^+ + 4e^- (E_{rev} = +0.21V) \qquad \text{Eqn. (2)}$$

The cathode potentials can reach 1.2-1.5 V and, over time, this relatively high voltage will result in the loss of carbon substrate supporting the catalyst at the cathode side. A loss of cathode substrate and catalyst area will reduce operating voltage, and ultimately limit life of the fuel cell 100.

Figure 2:
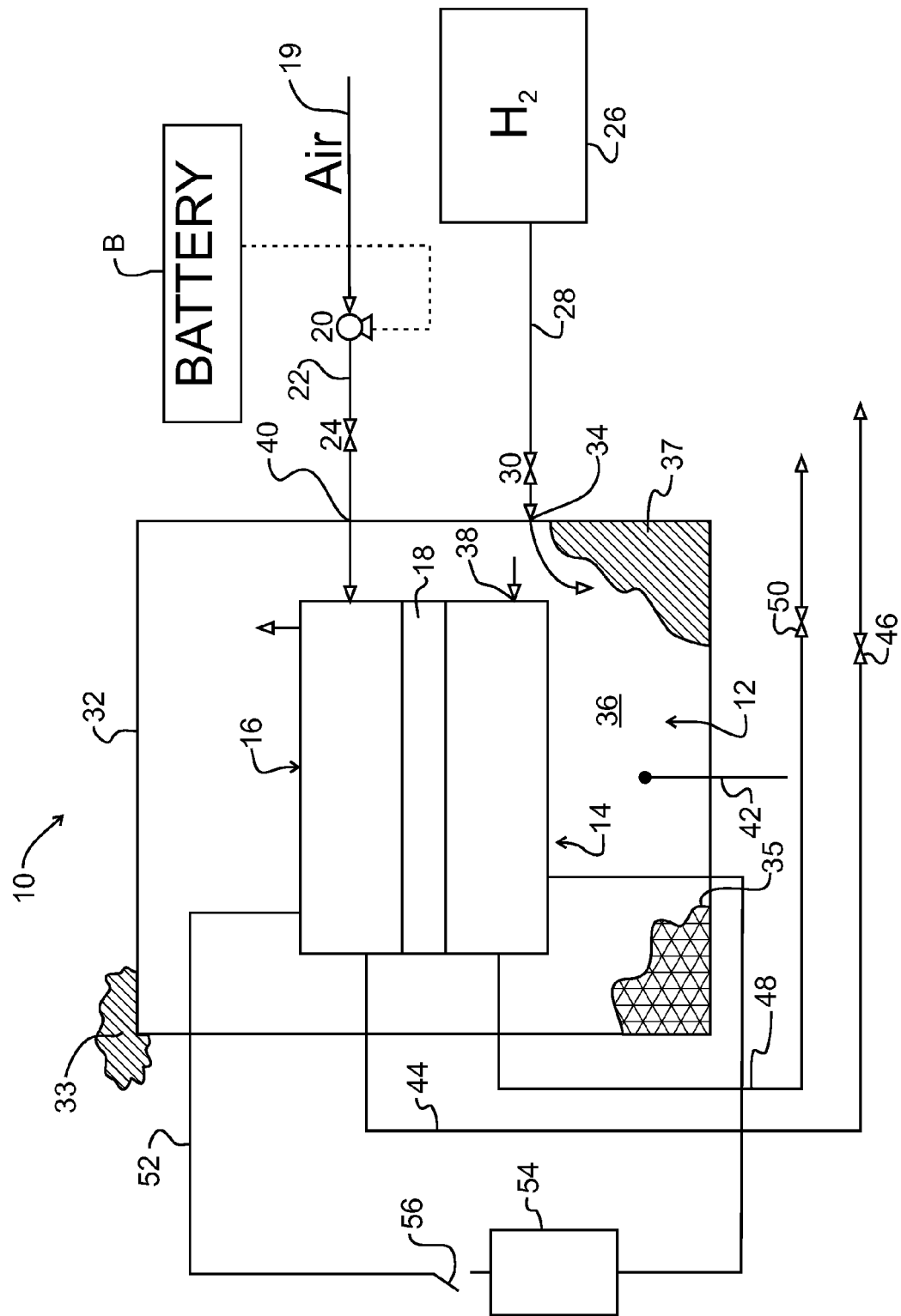
FIG. 2 is a schematic view of a fuel cell system according to one embodiment of the invention.

Referring now to FIG. 2, one embodiment of the invention may include a fuel cell system 10 including a fuel cell apparatus having a fuel cell stack 12. The stack 12 may include an anode side 14, a cathode side 16, and a membrane 18, such as a solid polyelectrolyte membrane, between the anode and cathode sides 14, 16. An air source or an inlet conduit 19 may be connected to an air compressor 20, and an air compressor outlet conduit 22 may be connected from the compressor 20 to the cathode side 16 of the fuel cell stack 12 through a first or cathode inlet valve 24 provided in the air compressor outlet conduit 22. A battery B may be connected to the air compressor 20 to power the same. A hydrogen source 26 may be provided, such as compressed hydrogen in a storage tank or liquid hydrogen in a storage tank. A hydrogen supply line 28 may be provided connected at one end to the hydrogen source 26 and at a second end to the anode side 14 of a fuel cell stack 12 through a second or anode inlet valve 30 provided in the hydrogen supply line 28 to control the flow of gas therethrough.

An enclosure 32 may at least partially enclose the fuel cell stack 12, and may be provided as part of an enclosure apparatus to reduce the amount of air or $O_2$ that may diffuse into or otherwise enter the fuel cell stack 12, such as after a fuel cell stack shutdown process. The enclosure 32 may be composed of any suitable material. For example, a corrosion-resistant metal (e.g. aluminum or stainless steel) may be used to preclude permeation or diffusion of gas therethrough. In another example, a metal-plastic composite may be used including plastic on the inside to prevent shorting in the event of contact with electrically-conductive parts of the stack 12 and a corrosion-resistant metal on the outside to minimize outward diffusion of $H_2$ and inward diffusion of atmospheric oxygen. An exemplary enclosure wall thickness for an exemplary fuel cell having 300 cells, 300×450 mm sidewalls, and operating at 80 kPa, may be about 5 mm for Al-6061 aluminum. All or part of the outer surface of the enclosure 32 may be designed to carry thermal insulation 33 (shown fragmented) so as to extend stack cooling time after shutdown. This will prevent the stack 12 from quickly losing heat during a brief shutdown in sub-freezing conditions. Thus, it may be beneficial to a subsequent startup operation and significantly reduces the number of freeze-thaw cycles during startup in sub-freezing temperatures. Also, the enclosure 32 may be constructed as a double shell vacuum enclosure.

In any case, the hydrogen supply line 28 communicates with an inlet port 34 of the enclosure 32 wherein hydrogen flows into an interior volume or hydrogen chamber 36 between an inner surface of the enclosure 32 and the exterior of the fuel cell stack 12. For a typical full-size stack, an exemplary estimated gas volume between the stack 12 and the enclosure 32 may be about 5 to 20 liters and, thus, may be comparable to a reactant volume inside the fuel cell stack 12, such as within about 20% thereof. However, the volume between the stack 12 and the enclosure 32 may be any suitable magnitude. In another example, that volume may be as large as packaging of the system 10 in a vehicle permits. The hydrogen gas flows within the hydrogen chamber 36 and eventually flows into the fuel cell stack 12 through an anode inlet 38. The air compressor outlet conduit 22 communicates through the enclosure 32 and with the fuel cell stack 12 through a cathode inlet 40.

The hydrogen chamber 36 of the enclosure 32 may be at least partially filled with any suitable foam 37 (shown fragmented) with a pore size sufficient to prevent flame propagation. The foam 37 may be of any material, for example, non-conductive material to allow contact with the stack 12 without electrical shorting. The foam 37 may be open pore to permit flow with a pore size of about 1 mm. The hydrogen chamber 36 of the enclosure 32 may also include a catalyst 35 (shown fragmented) therein to promote consumption of any $O_2$ in air that may enter the enclosure 32 during extended shutdowns. For example, an inside surface, or a portion thereof, of the enclosure 32 may be coated with the catalyst 35.

One or more sensors 42 may be placed in communication with the hydrogen chamber 36 such as to monitor levels of $O_2$, or air leaks. For example, the sensor(s) 42 may include an $O_2$ sensor, and/or a catalyst coated thermocouple or other suitable type of temperature sensor. An $O_2$ sensor inside the enclosure 32 may be set to 10% $O_2$ or less to give notice of any leak of $O_2$ and to trigger a shutdown of the stack 12 in case of a catastrophic failure of stack seals. The temperature sensor may detect air, within the enclosure wherein $H_2$ may be pulsed into the enclosure 32 to detect presence or undesirable amounts of air via temperature rise indicated by the catalyst coated temperature sensor. Furthermore, a $H_2$ combustion catalyst (such as Pt) may be coated within the enclosure 32 to consume any oxygen leaking out of the stack 12.

A cathode exhaust conduit 44 may be provided and may extend through the enclosure 32. The conduit 44 may be connected directly to the fuel cell stack 12 at one end, and may include a third or cathode outlet valve 46 for controlling the flow of gas therethrough. Similarly, an anode exhaust conduit 48 may be provided and may extend through the enclosure 32. The conduit 48 may be directly connected at one end to the fuel cell stack 12, and may include a fourth or anode outlet valve 50 for controlling the flow of gas therethrough. The isolation valves 24, 30, 46, 50 may be located adjacent the stack.

An electrical path 52 may be connected to the fuel cell stack 12 and may include an electrical device or load 54 and an electrical switch 56 to connect and disconnect the load 54 from the fuel cell stack 12. The load 54 may be an electrical motor or an electrical machine for propelling a vehicle. The compressor 20 may be powered by electricity generated by the fuel cell stack 12. The compressor 20, valves 24, 30, 46, 50 may be controlled in any suitable manner, such as by a fuel cell system controller (not shown) or the like.

During normal operation of the fuel cell stack 12, the first valve 24 in the air compressor outlet conduit 22 may be open and the third valve 46 in the cathode exhaust conduit 44 may be also open so that the air may be delivered through the cathode side 16 of the fuel cell stack 12. Similarly, the second valve 30 in the hydrogen supply line 28 may be open and the fourth valve 50 in the anode exhaust conduit 48 may be also open so that hydrogen may be delivered through the anode side 14 of the fuel cell stack 12. The hydrogen chamber 36 of the enclosure 32 may be at anode inlet pressure, and inlet $H_2$ may be pre-warmed to stack operating temperature in any suitable manner. Also, coolant overboard leaks may be directed into the anode inlet. For designs where the anode outlet exhausts to the hydrogen chamber 36 of the enclosure 32 (e.g. FIG. 6), the hydrogen chamber 36 may be at anode outlet pressure, and condensation may occur therein.

During fuel cell stack shutdown, the load 54 may be disconnected from the fuel cell stack 12 by opening the switch 56 in the electrical path 52. Auxiliary power, for example from the battery B, may be used to operate various components of the fuel cell system 10, including the air compressor 20. However, maintaining some load on the stack 12 to consume some cathode air, an open circuit voltage may be avoided at least during stack shutdown.

Prior to shutdown, the cathode side 16 may be operated at high air flows to prepare the stack 12 for freezing temperatures, and then the cathode inlet and outlet valves 24, 46 thereafter may be closed.

One or both of the anode inlet and outlet valves 30, 50, may be closed according to predetermined shutdown pressures and/or temperatures, for example, after the cathode inlet and outlet valves 24, 46 are closed.

The supply of hydrogen may be maintained within the hydrogen chamber 36 at a pressure above atmospheric pressure to prevent air from intruding from atmosphere while the cathode side 16 is still filled with unconsumed oxygen. For example, the elevated pressure of $H_2$ may be maintained by closing the anode outlet valve 50 and keeping the anode inlet valve 30 at least partially and/or periodically open.

According to one embodiment, the $H_2$ shutdown pressure may be elevated above normal operating pressures, for example to 160–180 $kPa_{absolute}$ ($kPa_{abs}$), depending on particular stack and enclosure volumes and temperatures to ensure positive $H_2$ pressure after cool down, at which point the $H_2$ valves are closed and no more active $H_2$ control may be required. The vacuum created by cool-down (e.g. water vapor condensation) and $H_2/O_2$ recombination in the stack 12 may be balanced by the initially elevated pressure of $H_2$ in the enclosure 32. After shutdown, such as after cathode side air purges, the system 10 may be in a passive state, wherein no active control need be applied to the inlet or outlet valves 30, 50.

Total enclosure volume may vary with shutdown pressure, and Table A demonstrates such varying shutdown pressure and volume within an enclosure at two different shutdown temperatures and assuming a final overall pressure of 110 $kPa_{abs}$ within the enclosure. In the calculations, gas phase and surface $O_2$, pressure drop due to $H_2O$ condensation, and gas cool down have been taken into account. These volumes can be significantly reduced by consuming the oxygen within active area as shown by the second set of numbers in brackets. This would be accomplished by blocking the flow of air at shutdown and consuming the oxygen within this air by applying a load to the stack until the voltage approach 0 while maintain the hydrogen pressure. All the valve to and from the stack would then be shut. [PLEASE CHECK THE DATA BELOW]

| Temperature (° C.) | Pressure ($kPa_{abs}$) | Volume (L at 110 $kPa_{abs}$), [w/o active area $O2$] |
|---|---|---|
| 80 | 180 | 17.8, [2.1] |
|  | 160 | 34.4, [8.5] |
|  | 140 | 140, [50] |
| 60 | 180 | 11.9, [0.7] |
|  | 160 | 21.7, [4.9] |
|  | 140 | 57.4, [21] |

According to another embodiment, the anode inlet valve 30 may be actively adjusted to maintain a relatively smaller $H_2$ overpressure in the enclosure 32, for example about 110–120 $kPa_{abs}$, until the stack 12 has cooled down to a predetermined temperature such as about 30 to 50° C., and more specifically about 40° C. wherein the $H_2/O_2$ recombination inside the stack 12 is substantially completed. After this time, which may be approximately 15-30 minutes, the $H_2$ inlet valve 30 may be closed and the stack 12 shut down. Any $H_2$ loss induced by filling the enclosure 32 at each shutdown to an elevated pressure corresponds to less than about 0.5 megajoule (MJ).

In either case, stack voltage then begins to drop, and the $H_2$ sealed in the anode side 14 may gradually consume the $O_2$ in the cathode side 16 by $H_2$ crossover, while $O_2$ crossing over from the cathode side 16 through the membrane 18 may be consumed by $H_2$ in the anode side 14. Accordingly, oxygen in the stack is allowed to be consumed by hydrogen. When the cell voltage is down to approximately 0.05 V, the oxygen in the cathode side 16 has been consumed by hydrogen crossing over from the anode side 14 through the solid electrolyte membrane 18 to the cathode side 16. Thus, the cathode side 16 may be now filled with nitrogen and water vapor. The $H_2$ in the hydrogen chamber 36 of the enclosure 32 gradually diffuses into the stack 12 as the stack 12 cools down, thereby leading to condensation of water vapor and reduction in volume of the gas inside of the stack 12.

The gas pressure between the inside of the stack 12 and the hydrogen chamber 36 of the enclosure 32 will eventually equilibrate. The final pressure will be determined by the volume of the inner hydrogen chamber 36 of the enclosure 32, system pressures at the point of shutdown, and the free volume created inside the stack 12 due to the consumption of reactant gases and to vapor condensation.

Due to the excess of hydrogen in the enclosed stack 12, any leftover oxygen in the cathode side 16 may be consumed after shutdown thereby leaving the cathode and anode sides filled with an $H_2/N_2$ gas mixture. Upon startup, there will be no $H_2$/Air front in the anode side 14, and any $H_2/N_2$ front in an anode side when a cathode side may be filled with $H_2/N_2$ mixtures will not cause any damage to the cathode side during startup.

After shutdown, pressure within the enclosure 32 may be maintained at an elevated pressure, just above atmospheric pressure, such as with a pressure regulator valve, which could be inlet valve 30. Accordingly, the pressure regulator valve may be actively or passively opened periodically to maintain the elevated pressure. The pressure regulator valve would allow isolation of the hydrogen supply except during the periodic fill cycles, and any rapid and/or sustained decay in enclosure pressure would indicate a leak. At predetermined time after shutdown, the supply of hydrogen may be suspended by actively closing the valve 30.

With the presently disclosed apparatus and method, $H_2$ flows through the hydrogen chamber 36 of the enclosure 32.

But if the hydrogen chamber 36 was not purged by reactant $H_2$, then the gas within the hydrogen chamber 36 might contain $O_2$ due to leaks from the cathode side of the stack 12. So, when a flow-through system is used as shown in FIG. 2, $O_2$ and any moisture ($H_2O$ vapor) leaking out from the stack 12 will be carried to the anode and electrochemically consumed by $H_2$ oxidation on an anode catalyst surface. Therefore, an $H_2$ atmosphere without $O_2$ may be ensured during both operation and shutdown.

Referring in general to FIGS. 3 through 9, these figures illustrate other embodiments of a fuel cell system. These embodiments are similar in many respects to the embodiment of FIG. 2 and like numerals between the embodiments generally designate like or corresponding elements throughout the several views of the drawing figures. Additionally, the descriptions of the embodiments are incorporated by reference into one another and the common subject matter may generally not be repeated.

Figure 3:
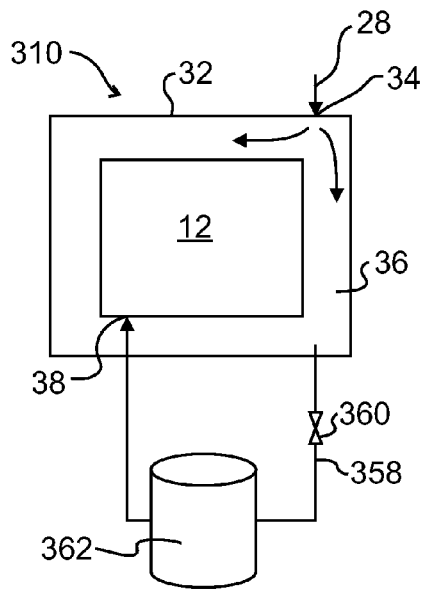
FIG. 3 is a schematic view of a portion of a fuel cell system according to another embodiment of the invention.

Referring to FIG. 3, a second fuel cell system 310 may include a humidification apparatus including a humidifier line 358, a humidifier valve 360, and a humidifier 362. An inlet end of the humidifier line 358 may be in fluid communication with the hydrogen chamber 36 of the enclosure 32, and an outlet end of the humidifier line 358 may be in direct fluid communication with the anode inlet 38 of the stack 12.

Accordingly, hydrogen flows through the hydrogen chamber 36 of the enclosure 32, and further flows out of the enclosure 32 through the humidifier line 358 and valve 360 en route to the humidifier 362 before being admitted directly back into the enclosure 32 and into the anode inlet 38 of the fuel cell stack 12. The valve 360 may be controlled in any suitable manner, such as by a fuel cell system controller (not shown) or the like.

Figure 4:
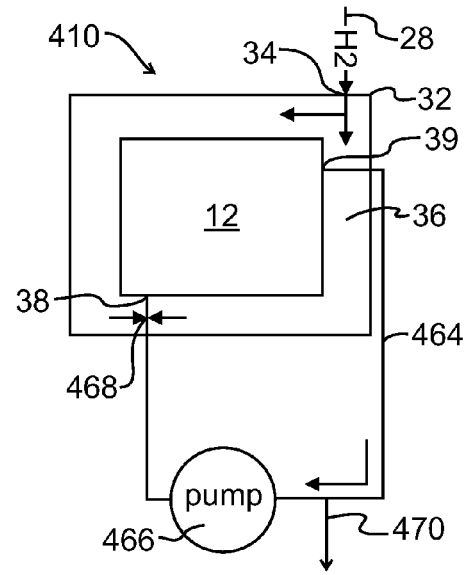
FIG. 4 is a schematic view of a portion of a fuel cell system according to another embodiment of the invention.

Referring to FIG. 4, a third fuel system 410 may include an anode recycling apparatus including a recycling line 464 extending through and externally of the enclosure 32, a recycling pump 466 in fluid communication with the recycling line 464, and a recycling tee 468 in fluid communication with the hydrogen chamber 36 of the enclosure 32 and with the recycling line 464. The recycling line 464 may sealingly extend through the enclosure 32 such as with any suitable seals therebetween (not shown). An inlet end of the recycling line 464 may be in direct fluid communication with an anode outlet 39 of the fuel cell stack 12, an outlet end of the recycling line 464 may be in direct fluid communication with the anode inlet 38 of the stack 12, and an intermediate portion may be in fluid communication with a bleed line 470 upstream of the pump 466.

Accordingly, hydrogen flows into the hydrogen chamber 36 of the enclosure 32, into the recycling tee 468, into the anode inlet 38, through the fuel cell stack 12, out the anode outlet 39, through the recycling line 464 and pump 466, and directly back into the anode inlet 38. Hydrogen may also flow out of the recycling line 464 through the bleed line 470. The pump 466 may be controlled in any suitable manner, such as by a fuel cell system controller (not shown) or the like. For good ventilation, the inlet 38 and outlet 39 may be placed generally opposite one another, such as at substantially opposite corners of the stack 12.

Figure 5:
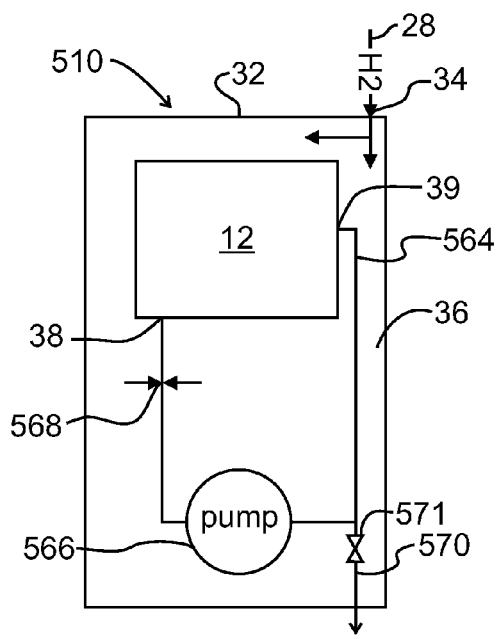
FIG. 5 is a schematic view of a portion of a fuel cell system according to another embodiment of the invention.

Referring to FIG. 5, a fourth fuel system 510 may include an anode recycling apparatus including a recycling line 564 extending internally of the enclosure 32, a recycling pump 566 in fluid communication with the recycling line 564, and a recycling tee 568 in fluid communication with the hydrogen chamber 36 of the enclosure 32 and with the recycling line 564. The pump 566 may be located within the enclosure 32 to minimize the number of enclosure penetrations and alleviate pump sealing requirements. An inlet end of the recycling line 564 may be in direct fluid communication with the anode outlet 39 of the fuel cell stack 12, an outlet end of the recycling line 564 may be in direct fluid communication with the anode inlet 38 of the stack 12, and an intermediate portion may be in fluid communication with a bleed line 570 upstream of the pump 566. The bleed line 570 may include a valve 571 to allow release of crossover nitrogen (and mixed hydrogen) from the anode such as when a concentration of $N_2$ exceeds a predetermined value.

Accordingly, hydrogen generally flows into the hydrogen chamber 36 of the enclosure 32, into the recycling tee 568, into the anode inlet 38, through the fuel cell stack 12, out the anode outlet 39, through the recycling line 564 and pump 566, and directly back into the anode inlet 38. Hydrogen may also flow out of the recycling line 564, through the bleed line 570, and out of the enclosure 570. The pump 566 may be controlled in any suitable manner, such as by a fuel cell system controller (not shown) or the like.

Figure 6:
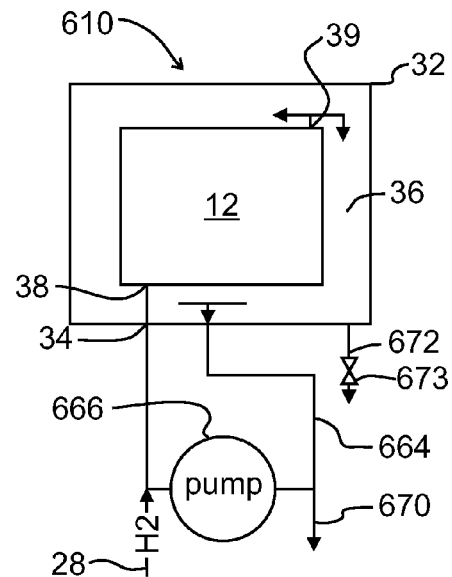
FIG. 6 is a schematic view of a portion of a fuel cell system according to another embodiment of the invention.

Referring to FIG. 6, a fifth fuel system 610 may include an anode recycling apparatus including a recycling line 664 extending through and externally of the enclosure 32, a recycling pump 666 in fluid communication with the recycling line 664, and a drain line 672 having an inlet end in fluid communication with the hydrogen chamber 36 of the enclosure 32 and extending through the enclosure 32. The drain line 672 may sealingly extend through the enclosure 32 such as with any suitable seals therebetween (not shown). The drain line 672 may be provided through the enclosure 32 to remove condensation, and could include a bleed or vent valve 673 or the like. When there is significant water accumulation within the enclosure due to water condensation from anode exit, the drain line valve 673 may open. An inlet end of the recycling line 664 may be in fluid communication with the hydrogen chamber 36 of the enclosure 32, an outlet end of the recycling line 664 may be in direct fluid communication with the anode inlet 38 of the fuel cell stack 12, and an intermediate portion may be in fluid communication with a bleed line 670 upstream of the pump 666.

Accordingly, hydrogen generally flows into the recycling line 664 downstream of the pump 666 and into the anode inlet 38, through the fuel cell stack 12, out the anode outlet 39, into the hydrogen chamber 36 of the enclosure 32, through the recycling line 664 and pump 666, and directly back into the anode inlet 38. Hydrogen may also flow out of the recycling line 664, through the bleed line 670, and out of the enclosure. The pump 666 may be controlled in any suitable manner, such as by a fuel cell system controller (not shown) or the like.

Figure 7:
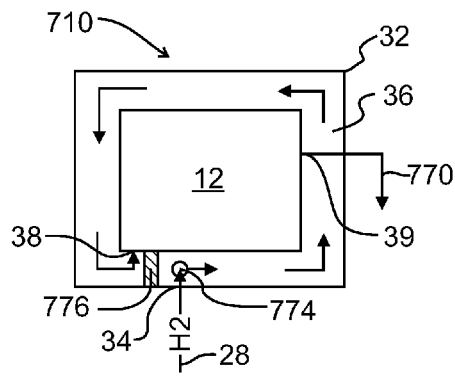
FIG. 7 is a schematic view of a portion of a fuel cell system according to another embodiment of the invention.

Referring to FIG. 7, a sixth fuel cell system 710 may include a hydrogen distribution conduit 774 disposed in the hydrogen chamber 36 of the enclosure 32 and in fluid communication with the hydrogen supply line 28. The system 710 may also include a baffle 776 disposed upstream of the tube 774 within the hydrogen chamber 36 of the enclosure 32 and in sealing contact between an interior portion of the enclosure 32 and an exterior portion of the fuel cell stack 12. The baffle 776 may be composed of any suitable material, for example, any suitable compliant foam so as to conform to the stack 12 and the enclosure 32 walls. The distribution conduit 774 and baffle 776 force the hydrogen to sweep around the perimeter of the stack 12 within the enclosure 32. The system 710 further may include a bleed line 770 in direct fluid communication with the anode outlet 39 of the fuel cell stack 12 and extending through and externally of the enclosure 32. Accordingly, hydrogen flows into and through the distribution conduit 774, into the hydrogen chamber 36 of the enclosure. Because of the baffle 776, the hydrogen flows downstream of the distribution conduit 774, around the periphery of the fuel cell stack 12, into the anode inlet 38 of the stack 32 just upstream of the baffle 776, and out of the anode outlet 39 of the stack 12 and out of the enclosure 32 through the bleed line 770.

Figure 7A:
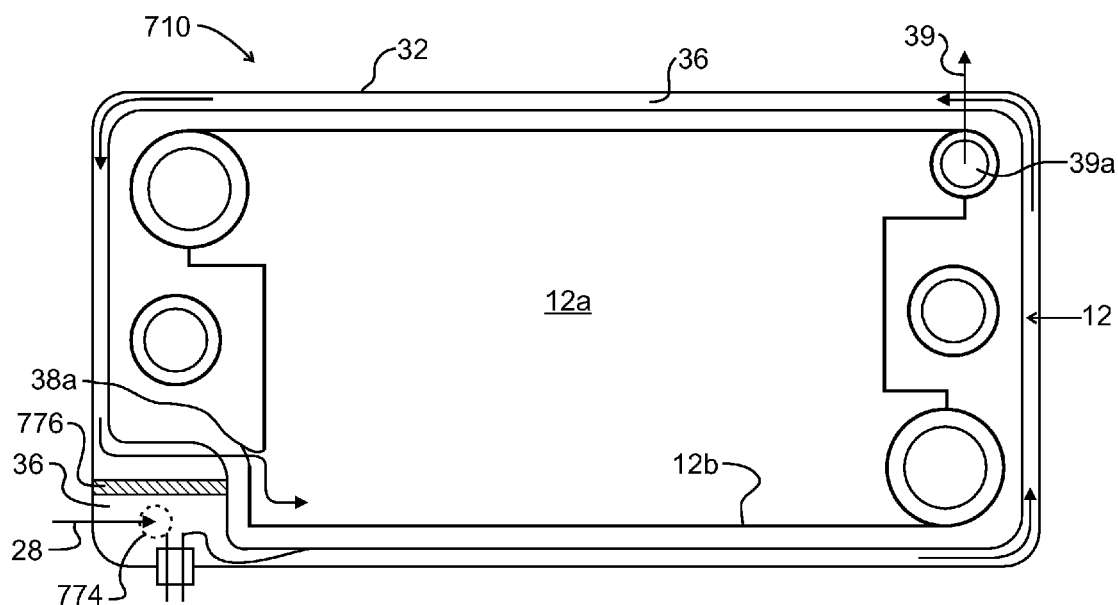
FIG. 7a is a transverse sectional schematic view of the portion of a fuel cell system of FIG. 7.

Referring to FIG. 7A, a portion of the sixth fuel system 710 is illustrated in a transverse sectional view to demonstrate peripheral flow sweep. The fuel cell stack 12 may include multiple plates 12a (one shown) having a seal 12b defining an anode inlet portion 38a of the anode inlet 38 (FIG. 7), and having an anode outlet header 39a in fluid communication with the anode outlet 39 (FIG. 7). In this view, it can be seen that hydrogen flows through the hydrogen supply line 28 through the enclosure wall, and through the distribution conduit 774 into the hydrogen chamber 36 of the enclosure 32. Because the baffle 776 may be located downstream of the anode inlet portion 38a, hydrogen may be forced to flow between the seal 12b and the enclosure 32 around the periphery of the stack 12 to a point just upstream of the baffle 776. From there, it may flow into the stack 12 through the anode inlet portion 38a. Excess hydrogen not combusted in the fuel cell stack 12 flows out of the anode outlet header 39a and outlet 39.

Referring to FIG. 8, a seventh fuel cell system 810 may include a hydrogen distribution conduit 874 disposed in the hydrogen chamber 36 of the enclosure 32 and in fluid communication with the hydrogen supply line 28. The system 810 also may include a baffle 876 disposed upstream of the tube 874 within the hydrogen chamber 36 of the enclosure 32 and in sealing contact between an interior portion of the enclosure 32 and an exterior portion of the fuel cell stack 12. The system 810 further may include an anode recycling apparatus including a recycling line 864 extending through and externally of the enclosure 32, a recycling pump 866 in fluid communication with the recycling line 864, and a recycling tee 868 in fluid communication with the hydrogen chamber 36 of the enclosure 32 and with the recycling line 864. An inlet end of the recycling line 864 may be in direct fluid communication with the anode outlet 39 of the fuel cell stack 12, an outlet end of the recycling line 864 may be in direct fluid communication with the anode inlet 38 of the stack 12, and an intermediate portion may be in fluid communication with a bleed line 870 upstream of the pump 866.

Accordingly, hydrogen flows into and through the distribution conduit 874, into the hydrogen chamber 36 of the enclosure. Because of the baffle 876, the hydrogen flows downstream of the distribution conduit 874, around the periphery of the fuel cell stack 12, and into the recycling tee 868 and the anode inlet 38 of the stack 32 just upstream of the baffle 876. From there, it may flow through the fuel cell stack 12, out the anode outlet 39, through the recycling line 864 and pump 866, and directly back into the anode inlet 38. Hydrogen may also flow out of the recycling line 864 through the bleed line 870.

Referring to FIG. 9, an eighth fuel system 910 may include an anode recycling apparatus including a recycling line 964 extending through and externally of the enclosure 32, a recycling pump 966 in fluid communication with the recycling line 964, and a drain line 972 having an inlet end in fluid communication with the hydrogen chamber 36 of the enclosure 32 and extending through the enclosure 32. An inlet end of the recycling line 964 may be in fluid communication with the hydrogen chamber 36 of the enclosure 32, an outlet end of the recycling line 964 may be in direct fluid communication with the anode inlet 38 of the fuel cell stack 12, and an intermediate portion may be in fluid communication with a bleed line 970 upstream of the pump 966. The system 910 also may include a baffle 976 disposed upstream of the anode outlet 39 within the hydrogen chamber 36 of the enclosure 32 and in sealing contact between an interior portion of the enclosure 32 and an exterior portion of the fuel cell stack 12.

Accordingly, hydrogen generally flows into the recycling line 964 downstream of the pump 966 and into the anode inlet 38, through the fuel cell stack 12, out the anode outlet 39, into the hydrogen chamber 36 of the enclosure 32, and around the periphery of the fuel cell stack 12. The baffle 976 directs the flow of hydrogen out of the enclosure 32, through the recycling line 964 and pump 966, and directly back into the anode inlet 38. Hydrogen may also flow out of the recycling line 964 through the bleed line 970.

Figure 10:
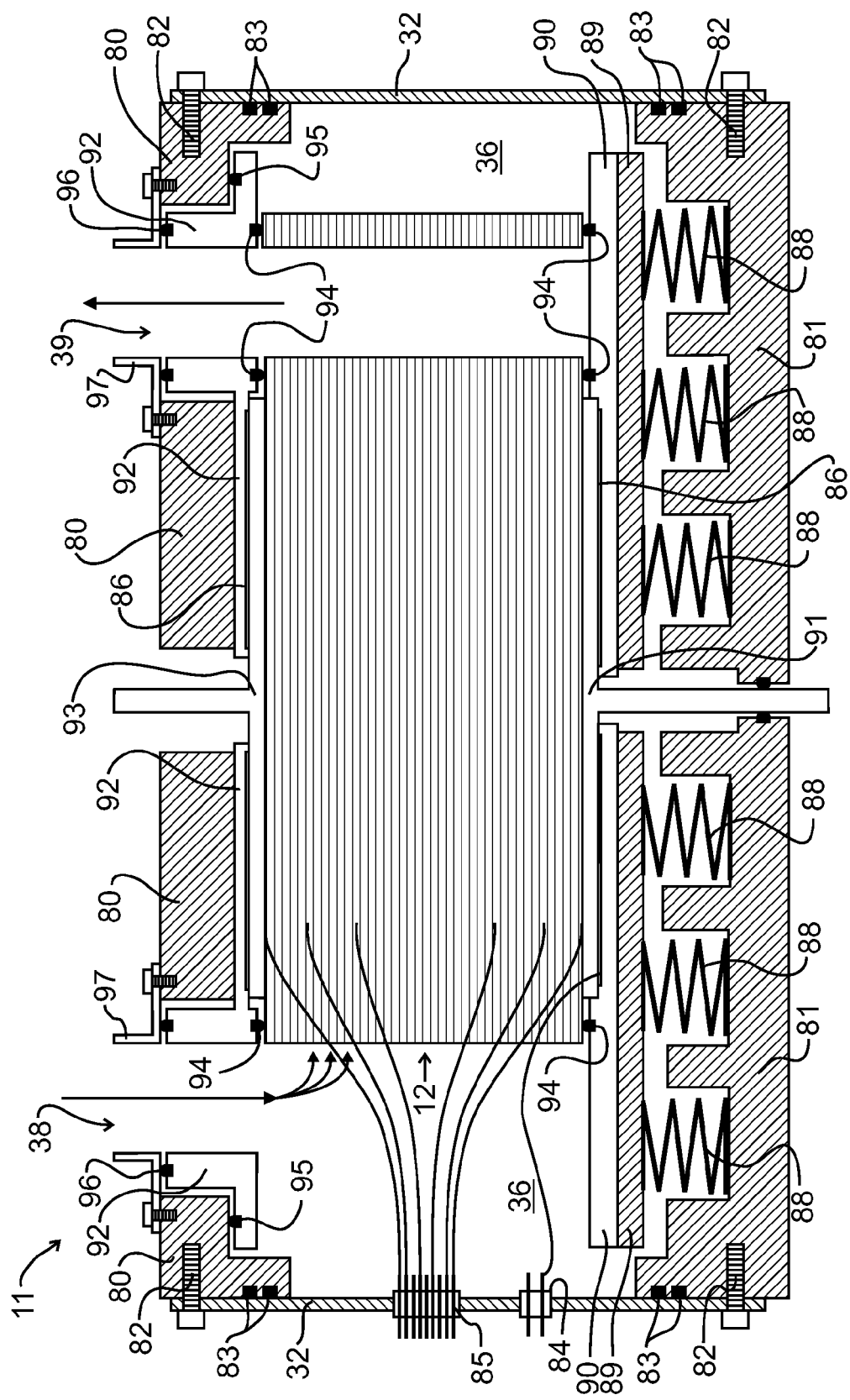
FIG. 10 is a schematic view of a portion of the fuel cell system of FIG. 1.

Referring to FIG. 10, a fuel cell apparatus 11 may include the fuel cell stack 12 and enclosure 32 from FIG. 2. The enclosure 32 may include a continuous wall or sleevelike component that at least partially surrounds and sealingly encloses the stack 12. Of course, the enclosure apparatus may not entirely sealingly enclose the stack 12, because entries and exits may be provided for the stack 12. In any case, the enclosure 32 generally may be carried by endplates 80, 81 of the apparatus 11 that sandwich the fuel cell stack 12 therebetween. More specifically, the enclosure 32 may be sealingly coupled to the endplates 80, 81 in any suitable manner. For example, the enclosure 32 may be welded, integrally fastened, and/or with separately fastened to the endplates 80, 81 using fasteners 82 such as cap screws, bolts, etc. And one or more seals 83, such as radial seals or any other suitable type(s), may be disposed between the enclosure 32 and the end plates 80, 81 to at least partially define the sealed hydrogen chamber 36 of the enclosure 32. The enclosure 32 may carry connectors 84, 85 to communicate electrical signals or power. For example, the connectors 84, 85 could be sealed or potted pass through connectors to carry electrical wires therethrough such as heater wires for connection to one or more heaters 86, cell voltage monitor (CVM) wires for connection to the individual cells of the stack 12, and the like. Also, the CVM connector 85 could be an optical connector, wherein the enclosure 32 may be composed of a clear material such as glass or clear plastic.

An enclosure apparatus for the stack 12 may include the enclosure 32, as well as all or part of wet and/or dry ends of the apparatus 11. For example, the wet end plate 80 and/or insulator plate 92 may define one end of the enclosure apparatus to make use of existing sealed penetrations such as for fuel cell headers. Similarly, the dry end plate 81 and/or insulator plate 90 may define another end of the enclosure apparatus. The enclosure 32 may be spaced from the lateral perimeter of the stack 12 to avoid electrical arcing between the enclosure 32 and electrically conductive portions of the stack 12.

The stack 12 may be supported by the dry end plate 81. Also, a plurality of springs 88 may be disposed between the end plate 81 and a push plate 89, and an insulator plate 90 may be disposed between the push plate 89 and the springs 88. Further, one of the heaters 86 and a buss component 91 may be disposed between the insulator plate 90 and the stack 12. Moreover, a seal 91' may be located between a terminal of the buss component 91 and the dry end plate 81.

The stack 12 also may be supported by the wet end plate 80. Also, an insulator plate 92, one of the heaters 86, and a current collector 93 may be disposed between the wet end plate 80 and the stack 12.

One or more seals 94 may be provided between the stack 12 and the insulator plates 90, 92. Similarly, one or more seals 95 may be provided between the insulator plate 92 and end plate 80. Likewise, one or more seals 96 may be provided between the insulator plate 92 and manifolds or fluid fittings 97 fastened thereto and in fluid communication with the stack headers. The seals 94, 95, 96 may be axial seals and/or any other suitable seals.

Figure 11:
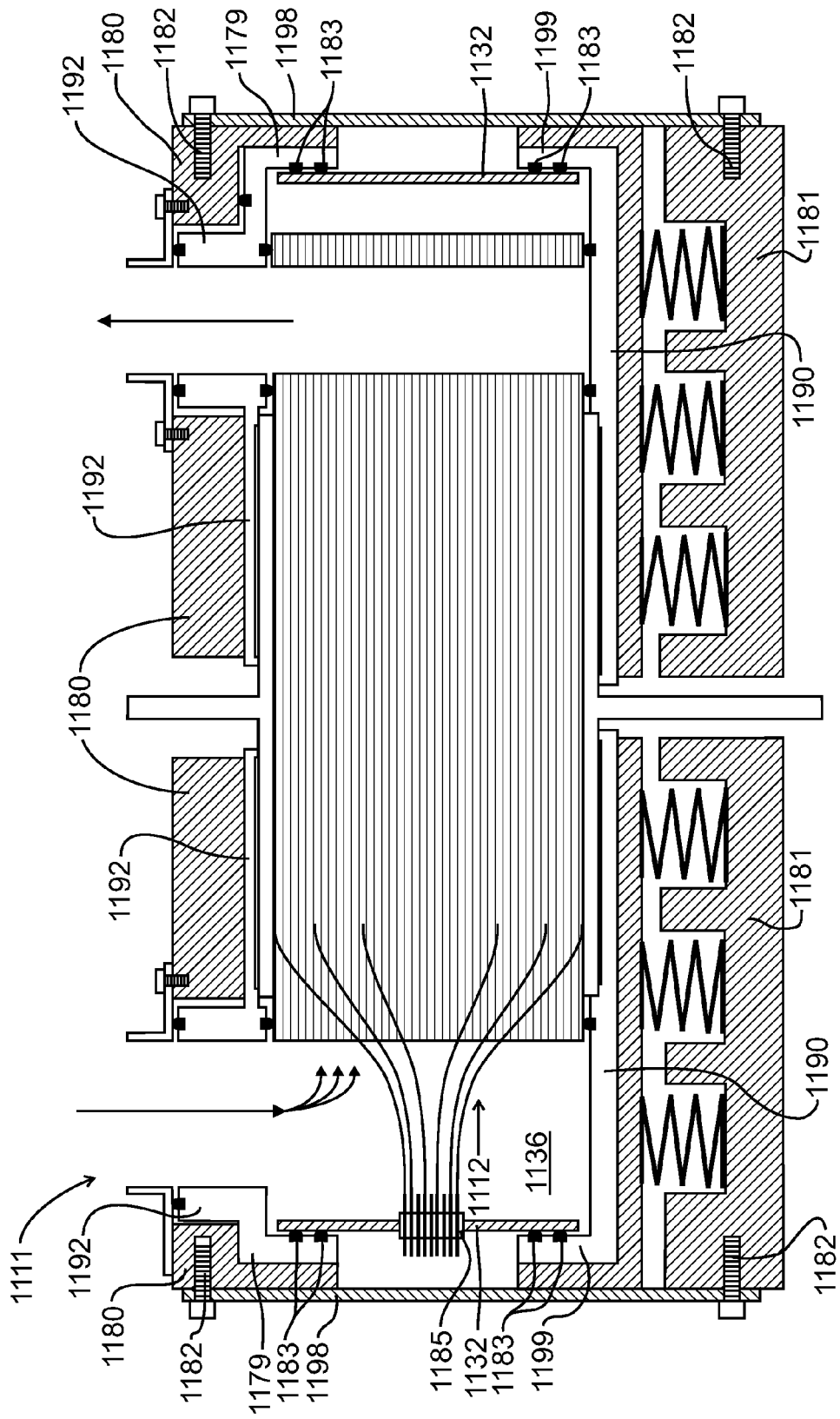
FIG. 11 is a schematic view of a portion of a fuel cell system according to another embodiment of the invention.

FIG. 11 illustrates another embodiment of a portion of a fuel cell system. This embodiment is similar in many respects to the embodiment of FIGS. 2 and 10 and like numerals between the embodiments generally designate like or corresponding elements throughout the several views of the drawing figures. Additionally, the descriptions of the embodiments are incorporated by reference into one another and the common subject matter may generally not be repeated here.

A fuel cell apparatus 1111 may include a fuel cell stack 1112, and may be provided with one or more external side plates 1198, which may be a continuous wall or sleevelike component that generally surrounds the stack 1112. The side plate(s) 1198 generally may be carried by endplates 1180, 1181 of the apparatus 1111. More specifically, the side plate(s) 1198 may be attached to the endplates 1180, 1181 in any suitable manner, such as by welding, integral fastening, and/or with separate fasteners 1182 such as cap screws, bolts, etc.

The fuel cell apparatus 1111 may also include an enclosure apparatus including an enclosure 1132 disposed radially between the side plate(s) 1198 and the stack 1112. Insulator plates 1190, 1192 may be provided with axially extending portions 1179, 1199 at radially outboard peripheries of the plates 1190, 1192 to be sealingly coupled to the enclosure 1132 to at least partially define an interior volume or hydrogen chamber 1136 thereof. Also, one or more seals 1183, such as radial seals or any other suitable type(s), may be disposed between the enclosure 1132 and the insulator plates 1190, 1192 to at least partially define the sealed hydrogen chamber 1136 of the enclosure 1132. The enclosure 1132 may carry one or more sealed pass through connectors 1185 to carry electrical wires therethrough such as cell voltage monitor wires for connection to the stack 1112.

According to the apparatus and shut down techniques described in any one or more of the aforementioned embodiments, a fuel cell stack may be passively shut down with sufficient $H_2$ volume and pressure to maintain positive pressure within the stack until the stack has cooled. The pressure decreases after shut down due to gas contraction, condensation, $O_2$ diffusion into the stack and concomitant consumption by $H_2$, and $H_2$ diffusion from the stack. Nonetheless, the apparatus may, thus, extend the time before any air can enter the stack.

The presently disclosed method and apparatus may also eliminate the air/air storage situation during extensive time after shutdown that causes significant carbon corrosion in cathode and anode sides based on conventional carbon supported membrane electrode assemblies. It has been shown that the air stored in anode or cathode would result in a front divided cell, for example, at 25° C. where carbon oxidation and $O_2$ reduction would occur. Even though the kinetics are low at 25° C., 5% of total amount of conventional carbon would be lost during 82,100 non-operational hours, assuming a 10 year fuel cell vehicle lifetime and 5,500 hours of operation time (i.e., 24 hours*365 days*10 years−5,500 operation hours=82,100 hours). 5% of carbon weight loss might result in 20-30 mV loss at peak power current density. But with the proposed apparatus and methods, the air/air storage situation may be eliminated or significantly reduced because the stack 12 may be filled with $H_2/N_2$ whenever it is not operating.

In contrast to a conventional fuel cell stack that requires a relatively high sealing area around the stack perimeter, the presently disclosed apparatus sealingly encloses a plurality of fuel cells of a stack with a separate enclosure and relatively smaller sealing area. The large seal area of a conventional fuel stack typically results in a daily leak rate that exceeds the total void volume of the stack, even under best case conditions. In other words, the conventional stack will lose its entire volume of gas within a twenty four hour period. In contrast, the apparatus described herein does not leak or leaks to a significantly less degree. In any case, the apparatus may be used to define or control the composition of the gas surrounding a fuel cell stack, and may ventilate leaks, for example, by the flow path(s) described with respect to FIGS. 7-9 where the hydrogen flow sweeps around the volume to ventilate any leaks.

The above description of embodiments of the invention is merely exemplary in nature and, thus, variations thereof are not to be regarded as a departure from the spirit and scope of the invention.

What is claimed is:

1. A method comprising:
    operating a fuel cell system including a fuel cell stack, and a fuel cell enclosure at least partially enclosing the fuel cell stack and at least partially defining a hydrogen chamber between the enclosure and the stack, which includes an anode side and a cathode side, the operating comprising including flowing hydrogen into the anode side and flowing air into the cathode side, producing electricity, and operating a primary electrical device connected to the stack using the electricity;
    shutting down the stack including:
        disconnecting the stack from the primary electrical device;
        stopping the flow of air into and out of the cathode side;
        maintaining a positive pressure of hydrogen in the hydrogen chamber between the enclosure and the stack above atmospheric pressure; and
        allowing oxygen in the stack to be consumed by hydrogen.

2. The method as set forth in claim 1, stopping the flow of hydrogen into the anode side after the flow of air into and out of the cathode side has stopped.

3. The method as set forth in claim 2, wherein the maintaining the positive pressure and the stopping the flow of hydrogen into the anode side is carried out at about 110 to 120 kPa and until fuel cell stack temperature has cooled to less than about 50° C.

4. The method as set forth in claim 2, wherein the maintaining the positive pressure is carried out at about 160 to 180 kPa.

5. The method as set forth in claim 1, wherein the maintaining the positive pressure is carried out passively after fuel cell stack shutdown.

6. The method as set froth in claim 5, wherein the maintaining the positive pressure is carried out using a passively operated pressure regulator valve.

7. The method as set forth in claim 1, wherein said fuel cell system further includes a hydrogen supply; said anode side include a hydrogen inlet and a hydrogen outlet: and the hydrogen chamber is in fluid communication with at least one of the hydrogen supply, hydrogen inlet or hydrogen outlet.

8. The method as set forth in claim 7, wherein the fuel cell system further comprises a hydrogen recycle line in fluid communication with the hydrogen chamber and the anode inlet.

9. The method as set forth in claim 8, wherein said fuel cell system further comprises a pump in fluid communication with the recycle line.

10. The method as set forth in claim 1, wherein the volume inside the hydrogen chamber is approximately the same as the reactant gas volume inside the fuel cell stack.

11. The method as set forth in claim 1, wherein the hydrogen chamber is at least partially filled with an open pore and non-conductive foam.

12. The method as set forth in claim 1, wherein the hydrogen chamber further includes a catalyst capable of promoting consumption of oxygen inside the chamber.

13. The method as set forth in claim 1, wherein the hydrogen chamber further includes a baffle in sealing contact between an interior portion of the chamber and the exterior portion of the fuel cell stack.

14. The method as set forth in claim 1, wherein the hydrogen chamber further includes a catalyst coated oxygen sensor adapted to measured air or oxygen leakage into the chamber.

* * * * *